US012496409B2

(12) United States Patent
Adda et al.

(10) Patent No.: US 12,496,409 B2
(45) Date of Patent: Dec. 16, 2025

(54) INJECTION HEAD FOR INJECTING A FLUID SUBSTANCE AND PERMITTING MONITORING OF THE INJECTION SITE BEFORE INJECTION OF THE FLUID SUBSTANCE, AND SYRINGE COMPRISING SUCH A HEAD (71) Applicant: Jean-Marc Adda, Boulogne-Billancourt (FR)

(72) Inventors: Jean-Marc Adda, Boulogne-Billancourt (FR); Jean-Yves Corbin, Le Fresne Camilly (FR); Mathias Destais, Caen (FR); Maxime Vaupres, Grentheville (FR)

(73) Assignee: Jean-Marc Adda, Boulogne-Billancourt (FR)

( * ) Notice: Subject to any disclaimer, the term of this patent is extended or adjusted under 35 U.S.C. 154(b) by 1016 days.

(21) Appl. No.: 16/969,356

(22) PCT Filed: Feb. 12, 2019

(86) PCT No.: PCT/FR2019/050304
§ 371 (c)(1),
(2) Date: Aug. 12, 2020

(87) PCT Pub. No.: WO2019/155177
PCT Pub. Date: Aug. 15, 2019

(65) Prior Publication Data
US 2021/0046251 A1   Feb. 18, 2021

(30) Foreign Application Priority Data
Feb. 12, 2018   (FR) ..................... 1851149

(51) Int. Cl.
*A61M 5/32*   (2006.01)

(52) U.S. Cl.
CPC .............. *A61M 5/32* (2013.01); *A61M 5/322* (2013.01); *A61M 2205/3327* (2013.01)

(58) Field of Classification Search
CPC .......... A61M 5/322; A61M 2005/3206; A61M 2005/3227; A61B 5/15003; A61B 5/150198; A61B 5/150526
See application file for complete search history.

(56) References Cited

U.S. PATENT DOCUMENTS 4,747,831 A * 5/1988 Kulli ................. A61M 25/0631
604/110
5,188,119 A * 2/1993 Sunderland ...... A61B 5/150641
600/576

(Continued)

FOREIGN PATENT DOCUMENTS

EP   0998953 A1   5/2000
EP   1317938 A1   6/2003

(Continued)

OTHER PUBLICATIONS

International Search Report for International Application No. PCT/FR2019/050304 mailed Jun. 5, 2019, 3 pages.

(Continued)

*Primary Examiner* — Laura A Bouchelle
*Assistant Examiner* — Adam J. Cermak
(74) *Attorney, Agent, or Firm* — TraskBritt (57) ABSTRACT

An injection head for a fluid substance to be injected through a skin barrier into an injection site on a body includes a connection body to be connected to a reservoir intended to contain the fluid substance to be injected. A hollow tube extends from the connection body and is configured to communicate with an outlet of the reservoir when the connection body is connected to the reservoir. the hollow tube or the connection body having a region for monitoring and characterizing a liquid originating from the injection site (Continued)

prior to injection of the fluid substance. A solid needle extends from the connection body, and a control mechanism is configured to control movement of the needle relative to the hollow tube between a pricking position and a position for monitoring and characterizing the fluid originating from the injection site via the region for monitoring and characterizing.

11 Claims, 4 Drawing Sheets

(56) References Cited

U.S. PATENT DOCUMENTS

| | | | | |
|---|---|---|---|---|
| 6,096,005 | A * | 8/2000 | Botich | A61B 5/150519 604/110 |
| 6,102,894 | A * | 8/2000 | Dysarz | A61B 5/154 604/110 |
| 6,186,979 | B1 * | 2/2001 | Dysarz | A61B 5/15003 604/110 |
| 6,277,102 | B1 * | 8/2001 | Carilli | A61M 5/1782 604/240 |
| 6,296,624 | B1 * | 10/2001 | Gerber | A61B 10/0045 604/164.11 |
| 6,468,250 | B2 * | 10/2002 | Yang | A61M 5/3232 128/919 |
| 8,512,299 | B2 * | 8/2013 | Shams | A61M 5/3232 604/240 |
| 9,550,030 | B2 * | 1/2017 | Zivkovic | A61M 5/508 |
| 9,694,139 | B2 * | 7/2017 | Shaw | A61M 5/50 |
| 9,814,841 | B2 * | 11/2017 | Shaw | A61B 5/150259 |
| 10,525,207 | B2 * | 1/2020 | Zivkovic | A61M 5/5066 |
| 10,549,050 | B2 * | 2/2020 | Zivkovic | A61M 5/3221 |
| 11,141,570 | B2 * | 10/2021 | Shaw | A61B 5/150503 |
| 2002/0165501 | A1 * | 11/2002 | Yang | A61M 5/322 604/240 |
| 2003/0236504 | A1 * | 12/2003 | Chen | A61B 5/150732 600/577 |
| 2004/0249309 | A1 * | 12/2004 | Yang | A61B 5/150389 600/576 |
| 2010/0049142 | A1 * | 2/2010 | Sims | A61M 5/322 604/196 |
| 2012/0071827 | A1 * | 3/2012 | Zivkovic | A61M 5/3213 604/110 |
| 2012/0078225 | A1 * | 3/2012 | Zivkovic | A61M 5/3276 604/110 |
| 2015/0025466 | A1 * | 1/2015 | Antonucci | A61B 5/15003 604/164.08 |
| 2015/0073304 | A1 * | 3/2015 | Millerd | A61B 5/150732 600/581 |
| 2016/0331909 | A1 * | 11/2016 | Shaw | A61M 5/3257 |
| 2017/0232207 | A1 * | 8/2017 | Zivkovic | A61M 5/502 604/198 |
| 2018/0008181 | A1 * | 1/2018 | Shaw | A61B 5/150496 |
| 2018/0193570 | A1 * | 7/2018 | Brown | A61M 5/3221 |
| 2019/0298973 | A1 * | 10/2019 | Shaw | A61B 5/15003 |

FOREIGN PATENT DOCUMENTS

| | | | |
|---|---|---|---|
| FR | 2659858 A1 | 9/1991 | |
| GB | 2534619 A * | 8/2016 | A61J 1/20 |
| WO | WO-9820922 A1 * | 5/1998 | A61M 5/322 |
| WO | WO-0056384 A1 * | 9/2000 | A61B 5/15003 |
| WO | 2015/082566 A1 | 6/2015 | |

OTHER PUBLICATIONS

International Written Opinion for International Application No. PCT/FR2019/050304, mailed Jun. 5, 2019, 8 pages.
European Communication pursuant to Article 94(3) EPC for European Application No. 19710738, dated Jan. 3, 2022, 6 pages including machine translation.
European Communication for European Application No. 19710738.6 dated Jun. 7, 2021, 15 pages including machine translation.

* cited by examiner

INJECTION HEAD FOR INJECTING A FLUID SUBSTANCE AND PERMITTING MONITORING OF THE INJECTION SITE BEFORE INJECTION OF THE FLUID SUBSTANCE, AND SYRINGE COMPRISING SUCH A HEAD

CROSS-REFERENCE TO RELATED APPLICATIONS

This application is a national phase entry under 35 U.S.C. § 371 of International Patent Application PCT/FR2019/050304, filed Feb. 12, 2019, designating the United States of America and published as International Patent Publication WO 2019/155177 A1 on Aug. 15, 2019, which claims the benefit under Article 8 of the Patent Cooperation Treaty to French Patent Application Serial No. 1851149, filed Feb. 12, 2018.

TECHNICAL FIELD

The present disclosure relates to the field of subcutaneous injection of fluid substances (in a non-limiting manner, filling product, blood derivative, product of sclerosis).

BACKGROUND

Resorting to aesthetic medical and surgical measures, by means of subcutaneous injection of fluids for reducing wrinkles (filling fluids) is increasing continuously. As a result, the risk of accidents due to vascular thrombosis is increasing exponentially.

Injection of filling fluids is thus associated with some risks, a significant one of which is the injection of the fluid into a blood vessel. In the present disclosure, a blood vessel is intended to mean the arterial network and the venous network. However, injection of a filling fluid into a blood vessel may obstruct the blood circulation (thrombosis), which may be more or less serious depending on the location of the affected vessel.

In order to reduce the risk of injecting the filling fluid into a blood vessel, a procedure for monitoring the presence of blood by means of aspiration has been put into place. An example of a syringe that allows for monitoring aspiration prior to the injection being performed is proposed in the patent application FR2659858. The syringe described comprises a transparent syringe tip that is provided with an oval opening, a transparent sleeve arranged inside the tip, the sleeve being formed of flexible transparent plastics material, and a transparent needle base that can be mounted on the tip as far as the oval opening. Monitoring the presence of blood, and thus the possible insertion of the needle into a blood vessel, is achieved in the following manner. The handler pinches the base of the needle between the thumb and index finger of the right hand and then presses, with the thumb of the other hand, on the sleeve, through the oval opening, and collapses it. The tip is then withdrawn from the base of the needle. Upon withdrawal of the tip from the base of the needle, the appearance of a blood volume in the tip indicates that the needle is inserted in a blood vessel. In this case, the handler does not continue with injecting the fluid. In contrast, if no blood rises into the tip this indicates that the needle is not implanted in a blood vessel. In this case, the handler may continue with injecting the filling fluid. In order to achieve this, the handler ceases the pressure exerted on the sleeve, replaces the tip at the bottom of the base, and proceeds to inject the fluid by means of pressing on the syringe piston.

However, the syringe of the above-mentioned application has a major disadvantage in that it can be used for only two successive injection cycles if a viscous injection fluid is used. Indeed, following a first injection cycle the needle is full of fluid to be injected. In order to make the syringe more able to monitor a new injection site, it is necessary to free the needle and the transparent base by moving the injection fluid, present in the needle, toward the syringe, by means of aspiration. Now, since the depression is formed upstream of the needle, it may be the case that no blood rises, even if the needle has penetrated a blood vessel. This can be explained by insufficient aspiration, but can also occur in the case of aspiration that is very strong but that is ineffective owing to friction of the viscous fluid to be injected into a needle of a very small diameter.

It should be noted that the viscosity of filling products is significant, and guarantees the quality of the aesthetic action, and that, in recent years, the viscosity has broadly increased, rendering the syringe proposed in the patent ineffective in most cases.

Furthermore, it will be noted that this design requires handling with two hands, making the motion less easy, in particular, for untrained people.

The present disclosure aims to overcome these problems by proposing an injection head as well as a syringe comprising such a head, which makes it possible to monitor quickly, easily, and in a precise manner, the site in which the needle is implanted, while allowing for injection of the fluid substance without additional handling when monitoring a plurality of sites prior to injection, and also aims for it to be possible to use the same syringe for a plurality of injection sites.

BRIEF SUMMARY

The present disclosure relates more particularly to an injection head and a syringe equipped with such an injection head, for injecting a fluid substance in an injection site on the body, passing through the skin barrier, the head making it possible, prior to the injection, to monitor the presence of a liquid originating from the injection site, and to characterize the liquid.

The injection head according to the present disclosure is intended, in particular, but not exclusively, for subcutaneous injection of an exogenic fluid substance, in particular, a hyaluronic acid, for aesthetic purposes such as filling in skin irregularities in the form of depressions, such as wrinkles.

The injection head according to the present disclosure can also be provided for injecting an endogenous fluid substance, previously drawn or tapped from the body, for reinjection into an injection site on the body, after having been treated, if necessary.

For this purpose, and according to a first aspect, the present disclosure proposes an injection head for a fluid substance that is intended to be injected in an injection site on the body, passing through the skin barrier, the head making it possible, prior to the injection, to monitor the presence of a liquid originating from the injection site, and to characterize the liquid. The present disclosure is notable in that it comprises a connection body that is intended to be connected to a reservoir, the pressure of which can be controlled, the reservoir being intended to contain the fluid substance to be injected, the connection body being extended by a hollow tube that is intended to communicate with the outlet of the reservoir and has a distal end, and a needle having a pointed distal end, the hollow tube or the connection body comprising at least one region for monitoring and characterizing the fluid substance originating from the injection site, means for controlling the relative movement of the needle with respect to the hollow tube between a pricking position in which the pointed end of the needle, which is pulled out in the hollow tube, passes the distal end of the hollow tube in order to form, together with the distal end, a penetrating assembly, and a position for monitoring and characterizing the fluid substance originating from the injection site via the region for monitoring and characterizing, the pointed distal end of the needle being retracted into the distal end of the hollow tube in the position.

The control means advantageously comprise a shuttle that is mounted so as to be movable relative to the connection body in order to place the needle into the pricking position or into the position for monitoring and characterizing a liquid originating from the injection site.

Advantageously, the control means comprise resilient return means for returning the shuttle into the position in which the needle is in the pricking position.

Advantageously, the control means comprise resilient return means for returning the shuttle into the position in which the needle is in the position for monitoring and characterizing a liquid originating from the injection site.

Advantageously, the connection body comprises guide means that cooperate with complementary guide means arranged on the shuttle so as to guide the shuttle in its travel.

Advantageously, the shuttle and the connection body comprise retaining means that cooperate so as to retain the needle in the pricking position thereof or in the position thereof for monitoring and characterizing the liquid originating from the injection site.

Advantageously, the needle is solid or hollow.

According to a particular embodiment, the needle is rigidly connected to the shuttle, while the hollow tube is rigidly connected to the connection body. In this case and advantageously, the needle is slidably mounted in a guide channel that crosses the connection body, and in that the hollow tube communicates with the outlet of the reservoir via an injection channel that crosses the connection body and has an end leading into the guide channel. In particular, the control means are arranged so as to control the movement of the needle in the guide channel into a position for injecting the fluid substance, in which position the needle is positioned upstream of the outlet end of the injection channel. The needle is preferably solid.

According to another embodiment, the needle is rigidly connected to the connection body, while the hollow tube is rigidly connected to the shuttle. In this case and advantageously, the needle is hollow.

The present disclosure can also be implemented by connecting a system for delivering active ingredients, of the syringe driver or pump type, which delivers the active ingredient or any other fluid substance on demand, via a pipe, to the injection head connected to the pipe.

When connected to a syringe or any other device for delivering a fluid substance, the injection head according to the present disclosure makes it possible to make the act of injection safe so as to prevent any risk of necrosis by clogging a patient's artery. It also makes it possible to confirm the injection site in order to ensure correct delivery of a product to the correct location.

The present disclosure also relates to a syringe that is equipped, at the front, with an injection head as described above, the injection head being connected to the reservoir of the syringe. Advantageously, the injection head and the reservoir of the syringe constitute two independent parts that can be fixed to one another.

Advantageously, the injection head is removable.

Advantageously, the reservoir is pre-filled. In the case of hyaluronic acid, the syringe has a pre-filled volume that is typically between 0.5 and 2 cc.

The independence between the injection head and the reservoir of the syringe has several advantages.

Firstly, the independence makes it possible to change the injection head depending on the intervention conditions. In the case of using a pre-filled syringe, the practitioner first selects the reference of the active product and the volume he wishes to apply, on the basis of the indication and the region to be treated. The practitioner then selects the gauge and the length of the needle to be used for the injection (for example, a 25 mm and 30 gauge needle). The selection of the syringe (active ingredient and volume) and the selection of the injection head (gauge and length) are independent and are made by the practitioner at the time of treatment. The independence of the injection head and the body of the syringe thus allows for modulation depending on the requirements and the conditions of the intervention while ensuring security conditions with respect to pricking accidents and risks of contamination.

The independence also makes it possible, if necessary, to retain the same injection head throughout an intervention and to change the syringe. It also makes it possible to change the syringe while the needle is still inserted in the skin.

The present disclosure also relates to the use of an injection head for a fluid substance, in combination with a syringe, for monitoring, prior to the injection of a fluid substance in an injection site on the body in which the syringe is implanted, the presence of a blood vessel in the region of the injection site.

BRIEF DESCRIPTION OF THE DRAWINGS

Further objects and advantages of the present disclosure will become clear from the following description, given with reference to the accompanying drawings, in which:

FIGS. 3a to 6b show the mode of operation for injecting a filling fluid into an injection site by means of the syringe shown in FIG. 1, including a step of monitoring the site in which the needle of the syringe is implanted prior to the injection;

FIGS. 10a to 13b show the mode of operation for injecting a filling fluid into an injection site by means of the syringe shown in FIG. 8, including a step of monitoring the site in which the needle of the syringe is implanted prior to the injection.

For reasons of improved clarity, the identical or similar elements of the different embodiments are indicated by identical reference signs in all the figures.

DETAILED DESCRIPTION

With respect to FIGS. 1 to 6, an injection head 10 for a fluid substance 100 is described, which fluid substance is intended to be injected into an injection site 110 of the body. As will be seen in the following, the injection head 10 makes it possible, prior to injection of the fluid substance 100, to monitor the injection site 110 by verifying whether or not a liquid substance is present that originates from the injection site 110, and by characterizing the liquid. In the embodiment described, the injection head 10 equips a syringe 1 that is intended for injecting an exogenic fluid, i.e., a filling fluid such as a hyaluronic fluid or any other injection product.

Figure 1:
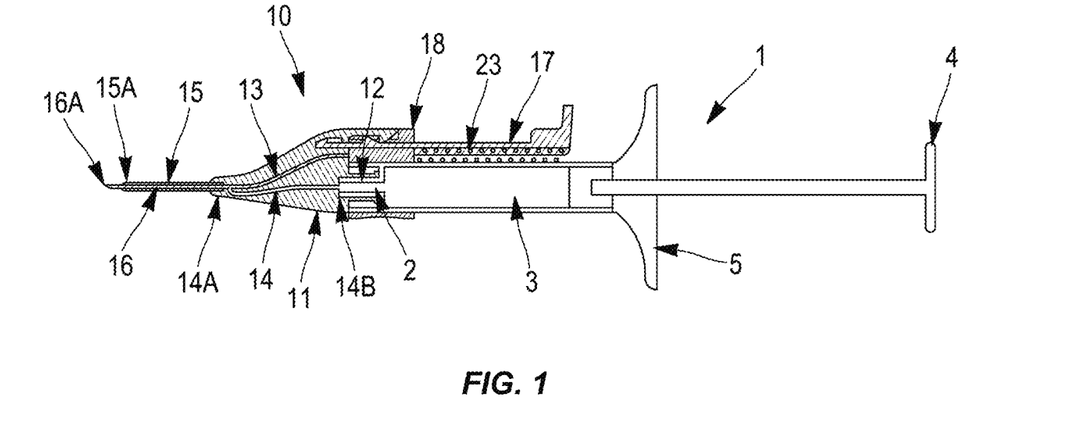
FIG. 1 is a schematic cross section of a syringe provided with an injection head according to a first embodiment, the injection head being in the pricking position.

In the embodiment described, the injection head 10 comprises a connection body 11 that is fixed on the front part of the syringe 1. The front part of the syringe means the part of the syringe that bears the tip 2 forming the outlet of the reservoir 3 of the syringe 1. More particularly, the connection body 11 comprises, at the rear, a coupling element 12 that forms a connection of the female Luer Lock type that is capable of cooperating with the tip 2 of the syringe 1, the tip 2 forming a connection of the male Luer Lock type. This is, of course, an example of the coupling, but any other type of coupling can be implemented without departing from the field of the present disclosure, in particular, Luer Slip.

The connection body 11 is crossed by two channels 13, 14, extending right through the front and rear parts of the connection body 11.

One of the channels 13, which defines a guide channel for an advantageously solid needle, as will be seen in the following, is extended, at the outlet of the front part of the connection body 11, via a flexible and advantageously transparent hollow tube 15. In the embodiment shown, the hollow tube 15 extends along the axis of the syringe 1.

The other channel 14 defines an injection channel. The channel comprises an end 14A that emerges from the guide channel 13, advantageously upstream of the hollow tube 15, and an end 14B that is in communication with the outlet of the reservoir 3 when the injection head 10 is in place on the syringe 1.

The injection head 10 further comprises an advantageously solid needle 16, which is slidably mounted inside the guide channel 13 in order to pass from a position in which the distal end 16A of the needle 16, which is preferably pointed, extends beyond the distal end 15A of the hollow tube 15 (FIG. 1), so as to form a penetrating assembly, at a position in which the distal end 16A of the needle 16 is positioned upstream of the end of the injection channel that emerges into the guide channel 13 (FIG. 2), and vice versa.

Figure 2:
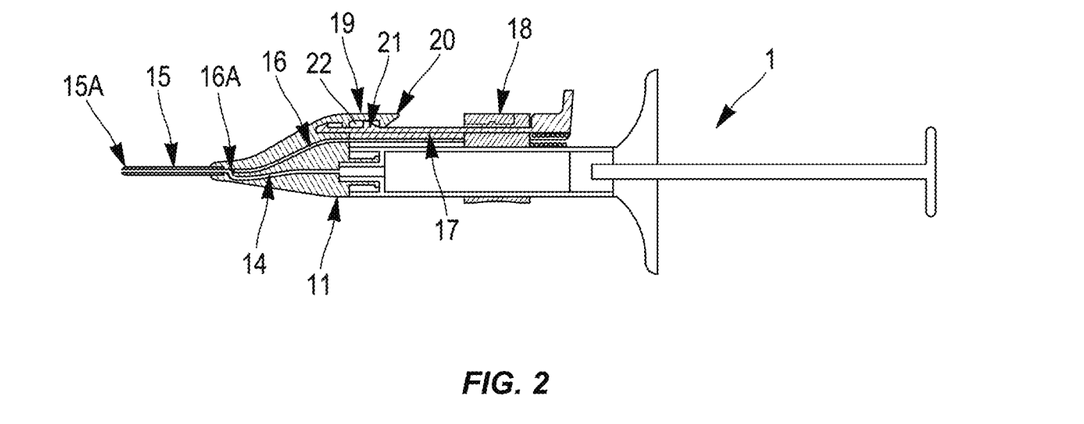
FIG. 2 is a schematic cross section of the syringe shown in FIG. 1, the injection head being in the position for monitoring and characterizing a liquid originating from the injection site in which the syringe is implanted.

The position in which the distal end 16A of the needle 16 extends beyond the distal end 15A of the hollow tube 15 thus defines a position known as the pricking position, while the position in which the distal end 16A of the needle 16 is positioned upstream of the outlet end of the injection channel 14 defines a position that makes it possible to monitor and characterize the presence of a liquid 112 originating from the injection site 110 and to characterize the liquid 112 via the hollow tube 15, as will be seen in the following.

The needle 16 is rigidly connected to a part that is movable with respect to the connection body 11. More particularly, the part, referred to in the following as the shuttle 18, is mounted so as to be movable in translation on an arm 17 extending in the rear part of the connection body, in parallel with the reservoir 3, in the direction opposing the injection direction of the filling fluid. Advantageously, the arm 17 is coupled to the connection body 11 such that a slight translational displacement of the arm 17 with respect to the connection body 11 along an axis parallel to the axis of the syringe is enabled. As a result of this arrangement, the needle 16 is placed in the pricking position or in the position for monitoring and characterizing, by displacing the shuttle 18 on the arm 17, this carrying along the needle 16 during the displacement thereof.

The shuttle 18 and the connection body 11 comprise reciprocal association means, which make it possible to keep the shuttle 18 in the vicinity of the connection body 11, and thus to keep the needle 16 in the pricking position thereof. In the embodiment shown, the shuttle 18 is retained on the connection body 11 by means of snap-fitting. More particularly, the connection body 11 comprises, at the rear, a finger 19 that is provided with a retaining lug 20 so as to plug into a T-shaped groove, which is provided on the shuttle 18 and is open in the direction of the connection body, the lug 20 coming into contact with the return portions of the T-shape of the groove. The groove arranged in the shuttle 18 and the finger 19 of the connection body 11 form the reciprocal association means. The retaining lug 20 is engaged in the groove by means of a lug 21 arranged on the arm 17 and arranged so as to form a ramp extending into the space 22 located between the retaining lug 20 and the connection body 11. When actuated, the arm 17 makes it possible to disengage the shuttle 18 from the retaining lug 20 of the connection body 11. The arm 17 serves both as a guide means for the shuttle 18 and as an actuation means for moving the needle 16 with respect to the connection body 11. It is referred to in the following as the actuation arm 17.

Advantageously, the injection head 10 comprises resilient return means 23 for returning the shuttle 18 preferably into the position in which the needle 16 is in the position for monitoring and characterizing, in order to protect the handler of the syringe 1 from any inadvertent emergence of the needle 16, and thus to prevent any risk of injury for the person handling the syringe 1 or for the person intended to receive the injection. In the embodiment shown, the return means are formed by a spring having one end connected in the region of the free end of the actuation arm 17, the other end being connected to the shuttle 18.

Figure 7:
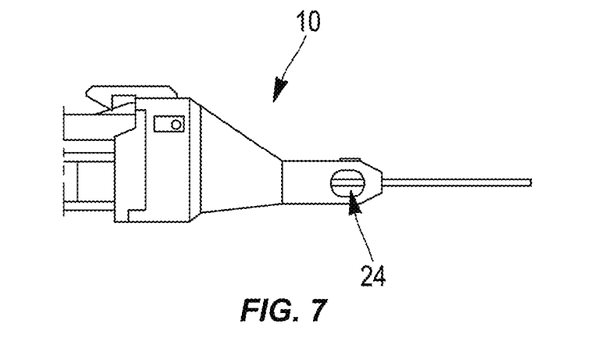
FIG. 7 shows another variant of the injection head, in particular, of the region for monitoring and characterizing the liquid originating from the injection site.

The injection head 10 further comprises a region for monitoring and characterizing the liquid 112 originating from the injection site 110. In the embodiment shown, the monitoring region is formed by the hollow tube 15 itself, the tube advantageously being transparent or locally transparent. However, it is intended for the region for monitoring and characterizing to be arranged in the region of the connection body 11 itself. FIG. 7 shows an embodiment in which the connection body 11 comprises a window 24 for monitoring and characterizing the liquid.

As indicated, the needle 16 is a preferably solid (i.e., not hollow) needle. The function of the arrangement of the needle 16 is that of promoting the phenomenon of aspiration when passing from the pricking position thereof to the position thereof for monitoring and characterizing, and thus ensuring aspiration of the liquid 112 that may be present in the injection site 110. Although logic would dictate using a solid needle, a needle that is hollow but the channel of which has been sealed preferably downstream nonetheless offers a function that is of interest, in particular, due to the mechanical flexibility thereof.

FIGS. 3a to 6b show the implementation of the syringe described above for injecting the filling fluid 100 into the injection site 110.

Figure 3A:
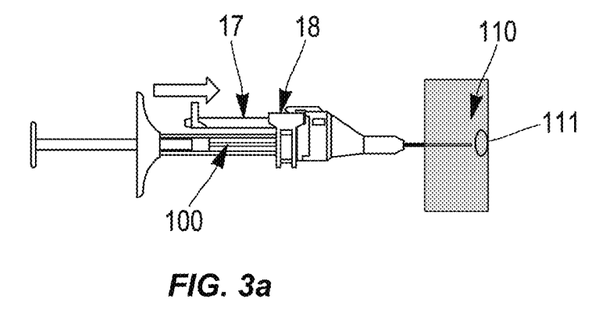
Figure 3B:
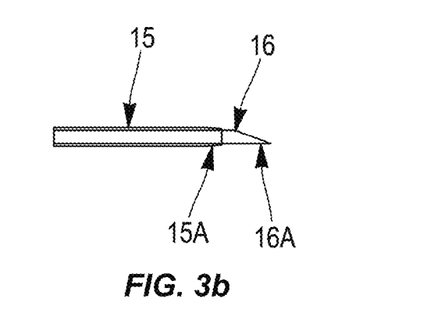
Figure 4A:
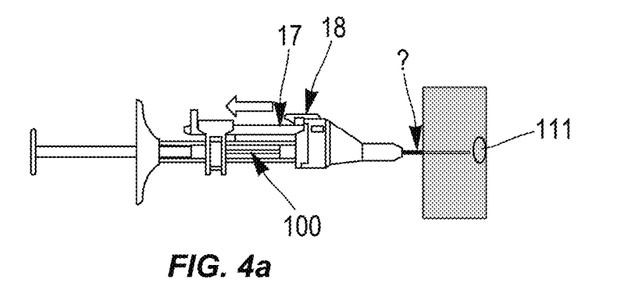
Figure 4B:
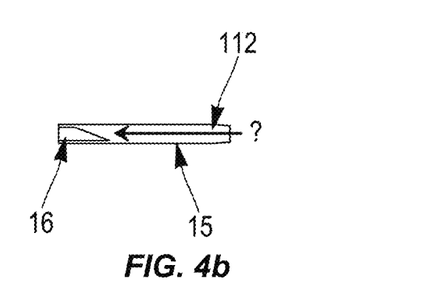

The first step, shown in FIG. 3a, consists in fitting the shuttle 18, i.e., engaging it with the connection body 11 via the retaining lug 20, if this is not already the case, in order to bring the needle 16 into the pricking position and then to prick the syringe into the injection site 110 in which the filling fluid 100 is intended to be injected (FIGS. 3a and 3b).

Figure 5A:
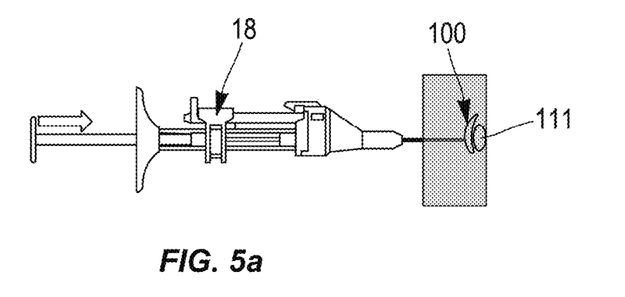
Figure 5B:
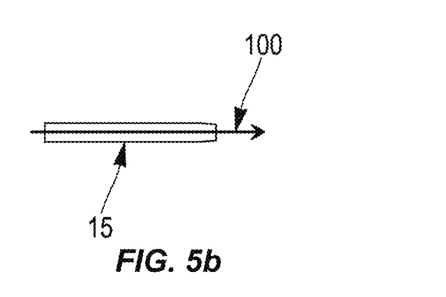
Figure 6A:
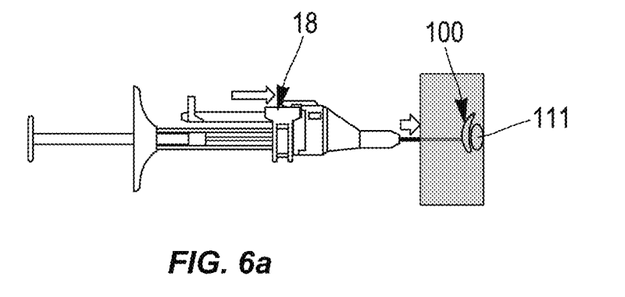
Figure 6B:
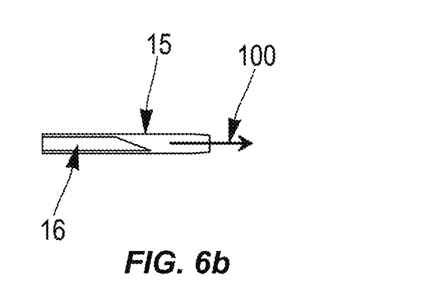

Subsequently, a check is made to ensure that the needle/hollow tube penetrating assembly is not implanted in a vessel 111. In order to achieve this, the actuation arm 17 is actuated in traction, with a slight descending movement (retraction) in the direction of the syringe, in order to free the shuttle 18 from the retaining lug 19. The freed shuttle 18 is carried along, by the return spring, in the direction of the free end of the actuation arm 17, carrying along with it the needle 16, such that the end 16A of the needle 16 is retracted from the injection site 110 in order to be positioned in the guide channel, upstream of the intersection between the guide channel and the injection channel (monitoring and characterizing position of the needle 16). Upon retraction of the end 16A of the needle 16 from the injection site 110 a depression is created, such that, if the penetrating assembly is implanted in a blood vessel, blood originating from the blood vessel is carried along in the interior of the hollow tube 15, under the action of aspiration but also the arterial pressure. Thus, if the handler sees blood appear in the hollow tube 15, following the passage of the needle 16 from the pricking position thereof to the position thereof for monitoring and characterizing, the handler knows that the syringe is implanted in the region of a blood vessel and, in this case, that the filling fluid may not be injected. In this case, the syringe is retracted and the pricking operation is started again at another location, and another check takes place. If, in contrast, no blood is seen rising into the interior of the hollow tube 15, the filling product is injected by means of actuating the piston 4 of the syringe as shown in FIGS. 5a and 5b (actuation according to the arrow shown in FIG. 5a), the filling product being carried along from the reservoir toward the injection site 110, via the injection channel. In order to proceed to full injection of the filling product, it is possible to bring the shuttle 18 back into engagement with the connection body, as shown in FIGS. 6a and 6b. When the shuttle 18 is brought back into engagement with the connection body, the needle 16, which is solid, carries along, by means of thrust, the filling product present, downstream of the intersection between the guide channel and the injection channel (and in the hollow tube), into the injection site 110.

In the example described above, the pricking at the outlet of the injection head 10 is provided in the axis of the syringe, the guide channel and the injection channel then being curved and the needle 16 being forced into a curve. Other arrangements may also be provided. For example, pricking at the outlet of the injection head 10 may be provided in the axis of the syringe, but with a guide channel that is also centered with the syringe, such that the needle 16 used is straight. Only the injection channel is pulled out into a curve. It is also possible for pricking at the outlet of the injection head 10 to be provided so as to be off-center with respect to the syringe, with a guide channel that is also centered on the pricking axis (and an associated straight needle 16), and a curved injection channel.

Figure 8:
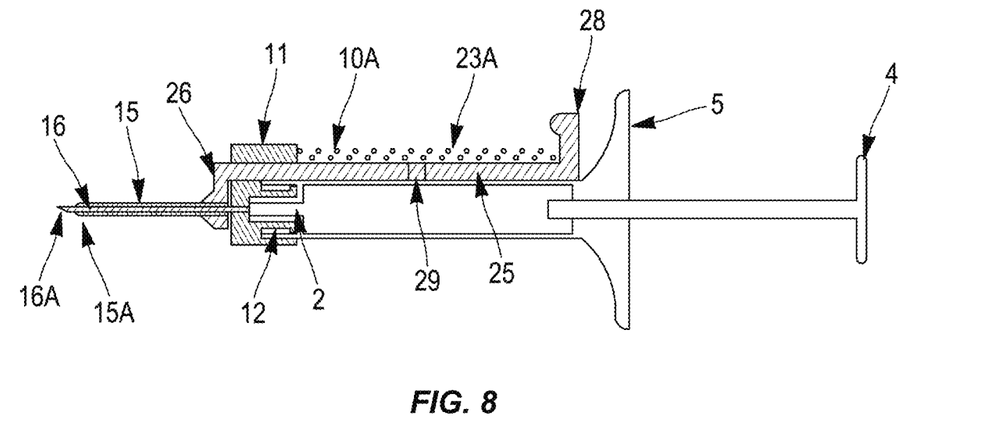
FIG. 8 is a schematic cross section of a syringe provided with an injection head according to another embodiment, the injection head being in the pricking position.
Figure 9:
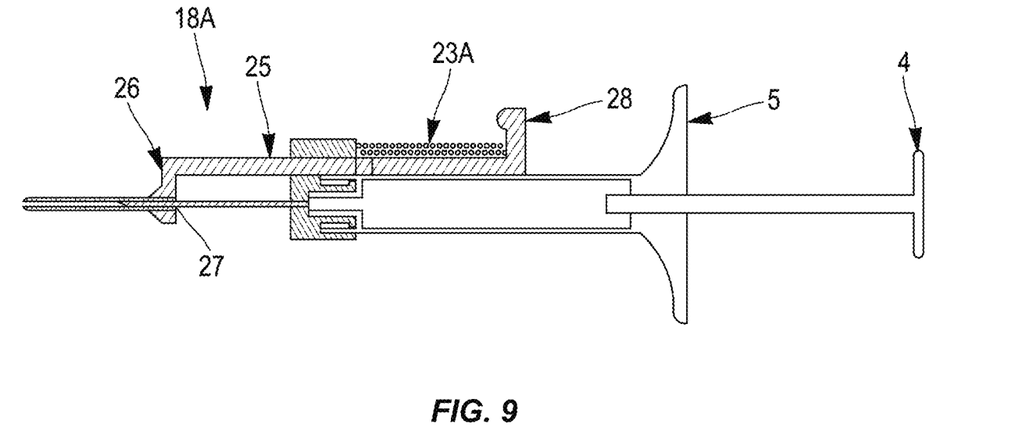
FIG. 9 is a schematic cross section of the syringe shown in FIG. 8, the injection head being in the position for monitoring and characterizing a liquid originating from the injection site in which the syringe is implanted.

FIGS. 8 and 9 show a syringe provided with an injection head 10A according to another embodiment.

As above, the injection head 10A comprises a connection body 11 that is fixed on the front part of the syringe 1 and comprises, at the rear, a coupling element 12 that forms a connection of the female Luer Lock type that is capable of cooperating with the tip 2 of the syringe 1, the tip 2 forming a connection of the male Luer Lock type.

The connection body 11 is crossed by an injection channel that is extended, at the output of the front part of the connection body 11, by the needle 16, and communicates, at the input, with the outlet of the reservoir 3, when the injection head 10A is in place on the syringe 1.

In this embodiment, the needle 16, which is hollow, is rigidly connected to the connection body 11. More particularly, the needle is mounted across the connection body 11 and communicates with the tip 2 of the syringe 1 when the injection head 10A is in place on the syringe 1.

The hollow tube 15, in turn, is rigidly connected to the shuttle 18A. In the embodiment shown, the shuttle 18A comprises an arm 25 that is slidably mounted in a groove arranged in the upper part of the connection body 11. The arm 25 comprises, at the distal end, an angled part 26 that is provided with a hole 27 through which the needle 16 extends, the hollow tube 15 being rigidly connected to the angled part and extending so as to be coaxial with the needle 16. The sliding of the shuttle 18A is actuated manually, by means of an actuation key 28 arranged in the region of the proximal end of the arm 25.

As above, the injection head 10A comprises resilient return means 23A for returning the shuttle 18A (or connection body 11) into the position in which the needle 16 is in the position for monitoring and characterizing (FIG. 9), in order to protect the handler of the syringe 1 from any inadvertent emergence of the needle 16, and thus to prevent any risk of injury for the person handling the syringe 1 or for the person intended to receive the injection. In the embodiment shown, the return means 23A are formed by a spring having one end connected in the region of the proximal end of the arm 25 of the shuttle 18A, the other end being connected to the connection body 11.

Advantageously, the portion of the arm 25 extending upstream of the connection body is provided with lateral lugs 29 for ensuring that the shuttle 18A is stopped in the position for monitoring and characterizing, when the actuation key 28 is released and the shuttle 18A is carried along by the spring in order to move from the pricking position to the position for monitoring and characterizing shown in FIG. 9.

FIGS. 10a to 13b show the implementation of the syringe described above for injecting the filling fluid 100 into the intended injection site 110.

Figure 10A:
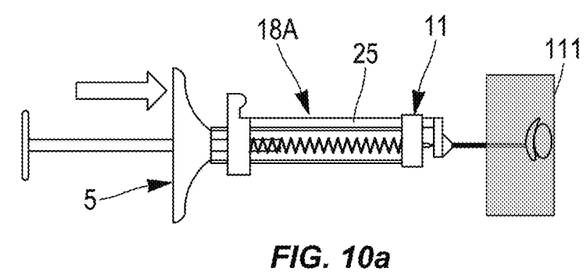
Figure 10B:
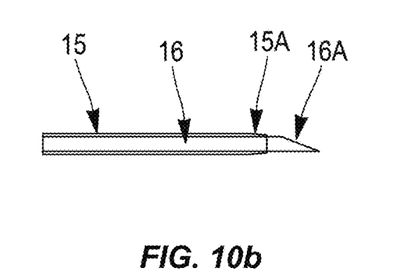

The first step, illustrated in FIG. 10a, consists in placing the arm 25 of the shuttle 18A at the back, and placing the thumb on the rear face of the guard 5 of the syringe and the index finger on the front face of the actuation key 28 and pulling the key to the rear, in the direction of the guard 5, in order to place the needle 16 in the pricking position (distal end of the needle 16 extending beyond the distal end of the hollow tube 15, as shown in FIG. 10b), to retain the arm 25 pulled toward the back, and to implant the syringe in the injection site 110 in which the filling fluid 100 is intended to be injected.

Figure 11A:
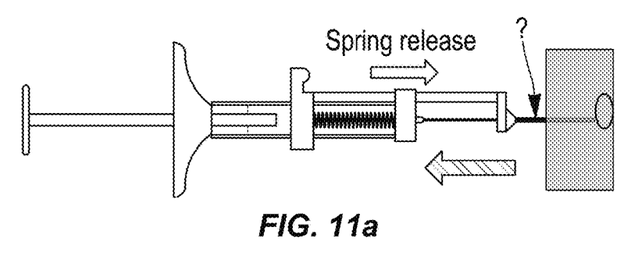
Figure 11B:
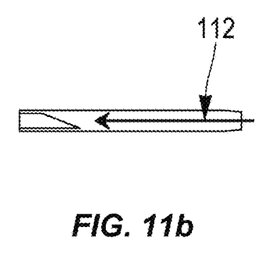
Figure 12A:
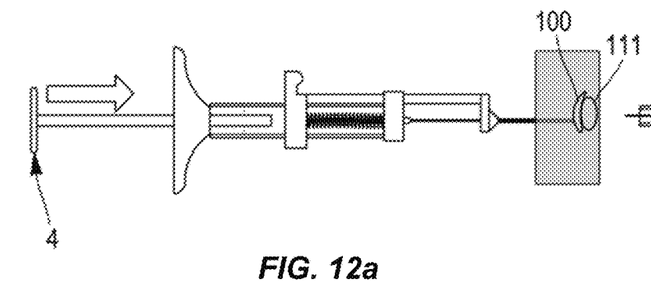
Figure 12B:
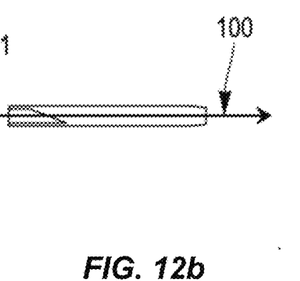
Figure 13A:
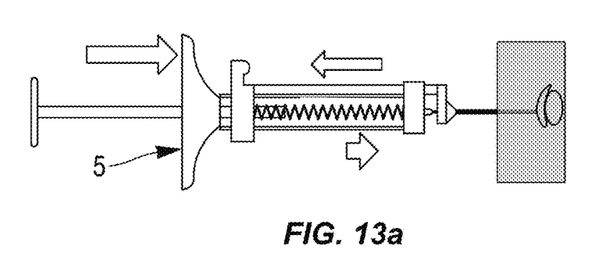
Figure 13B:
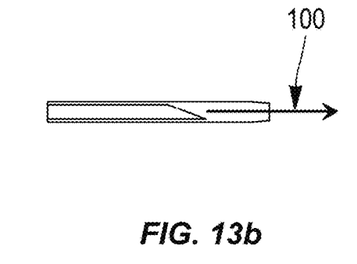

Subsequently, a check is made to ensure that the penetrating assembly is not implanted in a blood vessel 111. In order to achieve this, the pressure exerted on the guard 5 is released, while retaining the position of the shuttle 18A relative to the injection site 110. The syringe thus freed, and the connection body bearing the needle 16 that is rigidly connected to the syringe, are displaced to the rear, in translation, in the direction opposite to the injection site 110, with respect to the shuttle 18A, carrying along, in their displacement, the needle 16, which is retracted from the injection site 110 in order to be positioned so as to be set back from the distal end of the hollow tube 15, in the position for monitoring and characterizing (FIGS. 11a and 11b). As above, the depression is created by the retraction of the needle 16 or simply the blood pressure, such that, if the penetrating assembly is implanted in a blood vessel, blood originating from the blood vessel is carried along in the interior of the hollow tube 15, under the action of aspiration and/or the arterial pressure. Thus, if the handler sees blood appear in the hollow tube 15, during the passage of the needle 16 from the pricking position thereof to the position thereof for monitoring and characterizing, the handler knows that the syringe is implanted in the region of a blood vessel and, in this case, that the filling fluid may not be injected. In this case, the syringe is retracted and the pricking operation is started again at another location, and another check takes place. If, in contrast, no blood is seen rising into the interior of the hollow tube 15, the filling product is injected by means of actuating the piston of the syringe as shown in FIGS. 12a and 12b (actuation according to the arrow shown in FIG. 12a), the filling product being carried along from the reservoir toward the injection site 110, via the needle 16 and the hollow tube 15. In order to continue to complete injection of the filling product in order to evacuate the substance that is present and remaining in the hollow tube, toward the injection site (optional step), it may be possible to return the arm 25 of the shuttle 18A to the rear, while actuating the guard and the actuation key 28 together, while keeping the hollow tube implanted in the injection site 110 (FIGS. 13a and 13b), or to have the possibility of re-implanting the tube elsewhere.

In the case of the first embodiment shown in FIGS. 1 to 6b, the needle is solid, such that the displacement thereof in the hollow tube in the opposite direction from the injection site creates a depression that attracts the liquid. In the case of the second embodiment shown in FIGS. 8 to 13b, the needle is hollow but emerges into the syringe that is filled with fluid to be injected. Due to the low degree of fluidity of the injection fluid, the translation of the needle in the tube also creates a depression in the tube. A depression of this kind is advantageous for attracting blood, but is not strictly necessary. Thus, for example, if there is a leak of air between the hollow tube and the needle, the blood will still rise as far as the monitoring and characterizing region due to the fluidity thereof and the relative pressure at which it is in the body, while the air leak would have no impact on the injection dynamic due to the viscosity difference between fluid and air. Another design can also consist in a monitoring and characterizing region that is simply a through-hole located in the proximal part of the hollow tube or upstream of the hollow tube, in particular, along the guide channel, in the section thereof that is clear from the solid needle in the monitoring and characterizing position. Indeed, regarding an exceptional alert situation, the fact that the blood flows thus, in this particular case, may be acceptable in certain uses. It will also be noted that a hole having a small diameter, for example, 0.05 mm or 0.1 mm, can be suitable for allowing the atmospheric pressure and the blood to pass through, but not allowing the filling fluid to escape, which fluid is often a very viscous filling product.

The embodiments described above are related to an injection head 10 for an exogenic fluid substance. It is of course obvious that the present disclosure is not limited to this type of fluid substance, it being possible for the injection head according to the present disclosure to also be implemented for injecting endogenous substances previously extracted from a body, without departing from the scope of the present disclosure.

In the examples shown, the injection head is associated with a syringe or a syringe body. The injection head can also be implemented together with a delivery system of the syringe driver or pump type, which injects the fluid substance via a pipe, as far as the injection head, without departing from the scope of the present disclosure.

The present disclosure is described above by way of example. It will be understood that a person skilled in the art is able to implement different variants of the present disclosure, without in any way departing from the scope of the invention as defined by the claims.

The invention claimed is:

1. An injection head for a fluid substance that is intended to be injected through a skin barrier into an injection site on a body, the injection head comprising:
   a connection body that is intended to be connected to a reservoir, pressure of which can be controlled, the reservoir being intended to contain the fluid substance to be injected, the connection body comprising a guide channel and an injection channel, each of the guide channel and the injection channel extending from a front part of the connection body to a rear part of the connection body, the injection channel comprising one end emerged into the guide channel and another end configured to communicate with an outlet of the reservoir;
   a hollow tube extending from the guide channel of the connection body to an outlet of the front part of the connection body, the hollow tube configured to communicate with the outlet of the reservoir via the injection channel when the connection body is connected to the reservoir, the hollow tube having a distal end, the hollow tube or the connection body comprising at least one region for monitoring and characterizing a liquid originating from the injection site prior to injection of the fluid substance;
   a solid needle having a pointed distal end, the solid needle slidably mounted in the guide channel and extending from the connection body; and
   a control mechanism configured to control movement of the solid needle relative to the hollow tube between a pricking position and a position for monitoring and characterizing the fluid originating from the injection site via the region for monitoring and characterizing, wherein the control mechanism comprises a shuttle mounted to the connection body, the shuttle being movable relative to the connection body in order to place the solid needle into the pricking position or in the position for monitoring and characterizing the liquid originating from the injection site, wherein the solid needle is rigidly connected to the shuttle, and the hollow tube is rigidly connected to the connection body,
   wherein, in the pricking position, the solid needle extends through the hollow tube, the pointed distal end of the solid needle extends beyond the distal end of the hollow tube, and the pointed distal end of the solid needle and the distal end of the hollow tube form a penetrating assembly configured to penetrate into the injection site on the body, and wherein, in the position for monitoring and characterizing the fluid originating from the injection site, the solid needle remains extending through the hollow tube but the pointed distal end of the solid needle is retracted from the distal end of the hollow tube, the control mechanism operable to return the shuttle into a position in which the solid needle is in the pricking position after the solid needle has been retracted from the distal end of the hollow tube.

2. The injection head of claim 1, wherein the control mechanism comprises resilient return means for returning the shuttle into a position in which the solid needle is in the pricking position.

3. The injection head of claim 1, wherein the control mechanism comprises resilient return means for returning the shuttle into a position in which the solid needle is in the position for monitoring and characterizing the liquid originating from the injection site.

4. The injection head of claim 1, wherein the connection body comprises guide means and the shuttle comprises complementary guide means, the guide means cooperating with the complementary guide means so as to guide travel of the shuttle.

5. The injection head of claim 1, wherein at least one of the shuttle and the connection body comprises a retention feature configured to retain the solid needle in the pricking position or in the position for monitoring and characterizing the liquid originating from the injection site.

6. The injection head of claim 1, wherein the control mechanism controls movement of the solid needle in the guide channel into a position for injecting the liquid substance, in which position the solid needle is positioned upstream of the outlet end of the injection channel.

7. A syringe for injecting a fluid substance through a skin barrier into an injection site on a body, comprising:
a reservoir for containing the fluid substance to be injected, pressure of which can be controlled; and
an injection head, the injection head comprising:
a connection body connected to the reservoir, the connection body comprising a guide channel and an injection channel, each of the guide channel and the injection channel extending from a front part of the connection body to a rear part of the connection body, the injection channel comprising one end emerged into the guide channel and another end configured to communicate with an outlet of the reservoir;
a hollow tube extending from the guide channel of the connection body to an outlet of the front part of the connection body, the hollow tube configured to communicate with the outlet of the reservoir via the injection channel when the connection body is connected to the reservoir, the hollow tube having a distal end, the hollow tube or the connection body comprising at least one region for monitoring and characterizing a liquid originating from the injection site prior to injection of the fluid substance;
a solid needle having a pointed distal end, the solid needle slidably mounted in the guide channel and extending from the connection body; and
a control mechanism configured to control movement of the solid needle relative to the hollow tube between a pricking position and a position for monitoring and characterizing the fluid originating from the injection site via the region for monitoring and characterizing, wherein the control mechanism comprises a shuttle mounted to the connection body, the shuttle being movable relative to the connection body in order to place the solid needle into the pricking position or in the position for monitoring and characterizing the liquid originating from the injection site, wherein the solid needle is rigidly connected to the shuttle, and the hollow tube is rigidly connected to the connection body, wherein, in the pricking position, the solid needle extends through the hollow tube, the pointed distal end of the solid needle extends beyond the distal end of the hollow tube, and the pointed distal end of the solid needle and the distal end of the hollow tube form a penetrating assembly configured to penetrate into the injection site on the body, and wherein, in the position for monitoring and characterizing the fluid originating from the injection site, the solid needle remains extending through the hollow tube but the pointed distal end of the solid needle is retracted from the distal end of the hollow tube, the control mechanism operable to return the shuttle into a position in which the solid needle is in the pricking position after the solid needle has been retracted from the distal end of the hollow tube.

8. The syringe of claim 7, wherein the injection head and the reservoir of the syringe constitute two independent parts that can be fixed to one another.

9. The syringe of claim 7, wherein the injection head is removable.

10. The syringe of claim 7, wherein the reservoir is pre-filled.

11. A method of injecting a fluid substance through a skin barrier into an injection site on a body, comprising:
providing a syringe including:
a reservoir for containing the fluid substance to be injected, pressure of which can be controlled; and
an injection head comprising:
a connection body connected to the reservoir, the connection body comprising a guide channel and an injection channel, each of the guide channel and the injection channel extending from a front part of the connection body to a rear part of the connection body, the injection channel comprising one end emerged into the guide channel and another end configured to communicate with an outlet of the reservoir;
a hollow tube extending from the guide channel of the connection body to an outlet of the front part of the connection body, the hollow tube configured to communicate with the outlet of the reservoir via the injection channel, the hollow tube having a distal end, the hollow tube or the connection body comprising at least one region for monitoring and characterizing a liquid originating from the injection site prior to injection of the fluid substance;
a solid needle having a pointed distal end, the solid needle slidably mounted in the guide channel and extending from the connection body; and
a control mechanism configured to control movement of the solid needle relative to the hollow tube between a pricking position and a position for monitoring and characterizing the fluid originating from the injection site via the region for monitoring and characterizing, wherein the control mechanism comprises a shuttle mounted to the connection body, the shuttle being movable relative to the connection body in order to place the solid needle into the pricking position or in the position for monitoring and characterizing the liquid originating from the injection site, wherein the solid needle is rigidly connected to the shuttle, and the hollow tube is rigidly connected to the connection body, wherein, in the pricking position, the solid needle extends through the hollow tube, the pointed distal end of the solid needle extends beyond the distal end of the hollow tube, and the pointed distal end of the solid needle and the distal end of the hollow tube form a penetrating assembly configured to penetrate into the injection site on the body, and wherein, in the position for monitoring and characterizing the fluid originating from the injection site, the solid needle remains extending through the hollow tube but the pointed distal end of the solid needle is retracted from the distal end of the hollow tube, the control mechanism operable to return the shuttle into a position in which the solid needle is in the pricking position after the solid needle has been retracted from the distal end of the hollow tube;

placing the solid needle in the pricking position;

penetrating the penetrating assembly into the injection site of the body through the skin barrier;

after penetrating, moving the solid needle from the pricking position to the position for monitoring and characterizing the fluid originating from the injection site;

observing whether or not any fluid originates from the injection side; and injecting the fluid substance into the injection site of the body responsive to detecting that no fluid has originated from the injection site.

* * * * *